US009598890B1

(12) United States Patent
Hooton

(10) Patent No.: US 9,598,890 B1
(45) Date of Patent: Mar. 21, 2017

(54) INFINITE CHECK LINK SYSTEM

(71) Applicant: GM GLOBAL TECHNOLOGY OPERATIONS LLC, Detroit, MI (US)

(72) Inventor: Joel Hooton, Chesterfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/955,662

(22) Filed: Dec. 1, 2015

(51) Int. Cl.

| | |
|---|---|
| ***E05C 17/22*** | (2006.01) |
| ***E05F 5/06*** | (2006.01) |
| ***E05F 5/08*** | (2006.01) |
| ***E05F 5/02*** | (2006.01) |
| ***E05C 17/00*** | (2006.01) |
| ***B60J 5/00*** | (2006.01) |

(52) U.S. Cl.
CPC *E05F 5/06* (2013.01); *B60J 5/00* (2013.01); *E05C 17/025* (2013.01); *E05F 5/025* (2013.01); *E05F 5/08* (2013.01)

(58) Field of Classification Search
CPC ... Y10T 16/61; Y10T 16/629; Y10T 292/285; Y10T 292/286; Y10T 292/304; E05C 17/025; E05C 17/04; E05C 17/12; E05C 17/20; E05C 17/203; E05C 17/206; E05C 17/22; E05C 17/26; E05C 17/24; E05C 17/28; E05C 17/18; E05F 5/025; E05F 5/08; F05F 5/06; F05F 5/08; F05F 5/12
See application file for complete search history.

(56) References Cited

U.S. PATENT DOCUMENTS

| | | | | |
|---|---|---|---|---|
| 5,474,344 A * | 12/1995 | Lee | E05C 17/203 | 16/86 C |
| 6,446,305 B1 * | 9/2002 | Kneeland | E05C 17/206 | 16/49 |
| 2003/0037411 A1 * | 2/2003 | Seo | E05C 17/206 | 16/86 C |
| 2006/0150367 A1 * | 7/2006 | Matsuki | E05C 17/206 | 16/86 C |
| 2007/0012687 A1 * | 1/2007 | Lowen | E05C 17/203 | 219/724 |
| 2008/0066260 A1 * | 3/2008 | Clark | E05C 17/203 | 16/86 A |

(Continued)

FOREIGN PATENT DOCUMENTS

| | | | |
|---|---|---|---|
| FR | EP 0952289 A1 * | 10/1999 | E05C 17/203 |
| GB | 2160584 A * | 12/1985 | E05C 17/206 |

(Continued)

*Primary Examiner* — Chuck Mah
(74) *Attorney, Agent, or Firm* — Quinn Law Group

(57) ABSTRACT

A check system for selective movement between a frame and a door includes a link attached to one of the door and the frame, and a housing attached to the other of the door and the frame. The link defines a link friction surface. The housing defines a tunnel through which the link is selectively movable and a first housing ramp formed at an acute angle relative to the link. A friction plate is disposed within the housing, and defines a first plate ramp slidably engaged with the first housing ramp. The friction plate also defines a plate friction surface configured for contact with the link friction surface. A biasing member is operatively attached to the housing and biases the friction plate toward the link and the first housing ramp.

8 Claims, 4 Drawing Sheets

(56) References Cited

U.S. PATENT DOCUMENTS

| | | | | |
|---|---|---|---|---|
| 2009/0217582 | A1* | 9/2009 | May | B01D 53/02<br>48/127.3 |
| 2010/0154463 | A1* | 6/2010 | DeGennaro | F25D 3/08<br>62/457.1 |
| 2012/0246871 | A1* | 10/2012 | Settsu | E05F 5/025<br>16/83 |

FOREIGN PATENT DOCUMENTS

| | | | | |
|---|---|---|---|---|
| JP | 2003301650 | A | * | 10/2003 |
| JP | 2005179996 | A | * | 7/2005 |

* cited by examiner

INFINITE CHECK LINK SYSTEM

TECHNICAL FIELD

This disclosure generally relates to check systems or check link systems for doors.

BACKGROUND

Many doors, like those attached to automobiles and other vehicles, include a check system designed to both allow the door to swing and to hold the door steady. Therefore, the same check system may allow the door to move away from a frame and also secure a position of the partially opened door at a plurality of locations distal to the frame.

SUMMARY

A check system for selective movement between a frame and a door is provided. The check system includes a link attached to one of the door and the frame, and a housing attached to the other of the door and the frame. The link defines a link friction surface. The housing defines a tunnel through which the link is selectively movable and a first housing ramp formed at an acute angle relative to the link.

A friction plate is disposed within the housing, and defines a first plate ramp mirroring, and slidably engaged with, the first housing ramp. The friction plate also defines a plate friction surface configured for contact with the link friction surface. A biasing member is operatively attached to the housing and biases the friction plate toward the link and the first housing ramp.

The above features and advantages, and other features and advantages, of the present subject matter are readily apparent from the following detailed description of some of the best modes and other embodiments for carrying out the disclosed structures, methods, or both.

DETAILED DESCRIPTION

Figure 1:
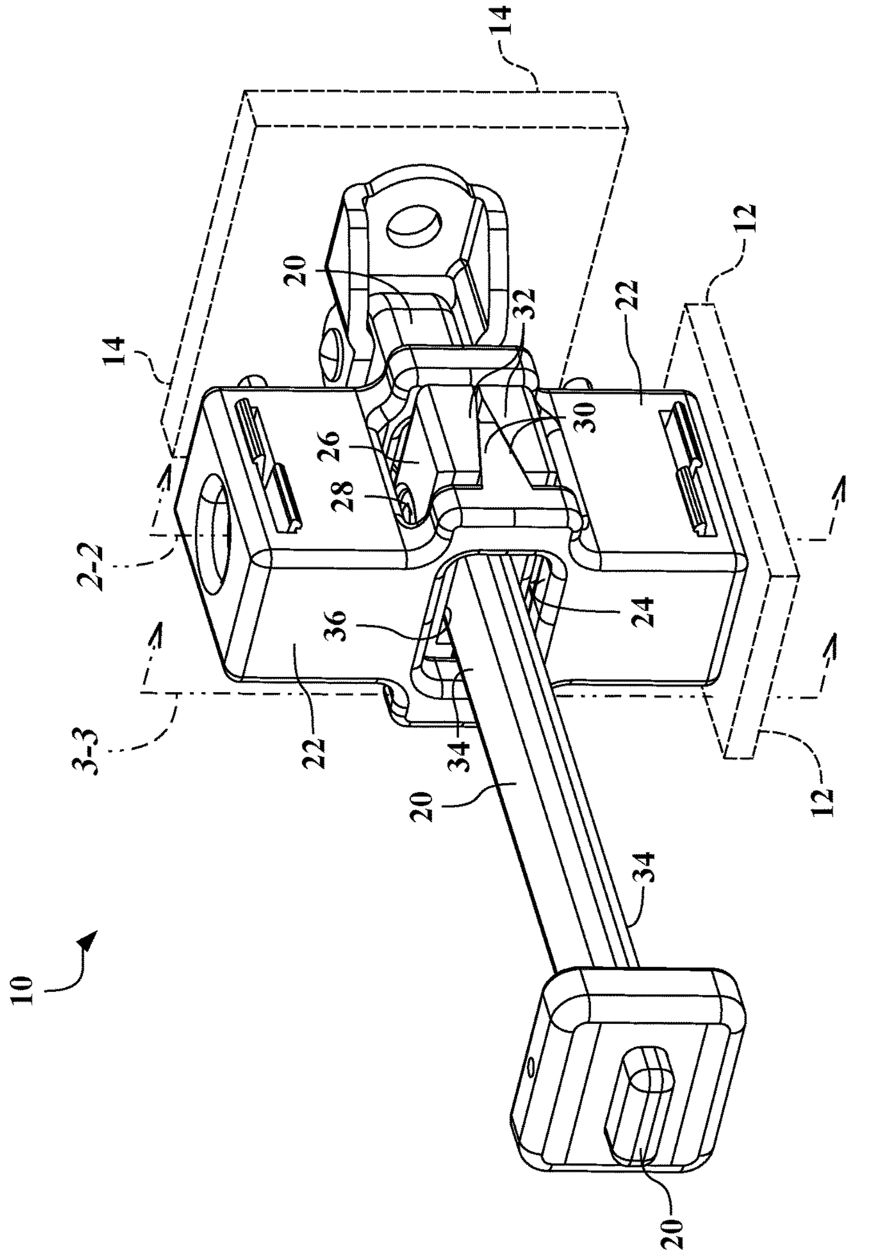
FIG. 1 is a schematic, isometric view of a check system for selectively positioning a door relative to a frame.

Referring to the drawings, like reference numbers correspond to like or similar components whenever possible throughout the several figures. There is shown in FIG. 1 an isometric view of a check system 10.

The check system 10 operates between a door 12 and a frame 14 to which the door 12 is movably attached. Both the door 12 and the frame 14 are illustrated only schematically in FIG. 1 and the interconnections therebetween are not shown.

The door 12 is generally pivotable or movable from a closed position, directly adjacent and sealed to the frame 14, and a plurality of open positions, offset from the frame 14 along a travel path. The door 12 swings or slides relative to the frame 14, and is configured to stop and hold position in an infinite number of locations. Note that the location of the door 12 and the frame 14 relative to the check system 10 may be reversed.

While the present disclosure may be described with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

The check system 10 allows for selective movement or position retention between the frame 14 and the door 12. A link 20 is attached to one of the door 12 and the frame 14. In the configuration shown, the link 20 is pivotally attached to the frame 14.

A housing 22 is attached to the other of the door 12 and the frame 14. In the configuration shown, the housing 22 is fixedly attached to the door 12. However, the check system 10 will operate in substantially the same manner if the housing 22 and the link 20 were attached to the opposed structures.

The link 20 illustrated in the figures is a straight generally continuous rod. However, in many configurations, the link 20 will be curved to facilitate rotation of the door 12 about hinges attached to the frame 14. Furthermore, note that the link 20 may pivot about an axis that is different from the axes of the hinges between the door 12 and the frame 14.

The housing 22 defines a tunnel 24 in which the link 20 is partially, and movably disposed. The tunnel 24 may be generally perpendicular to the portion of the link 20 disposed therein, as the housing 22 travels on an arc while the door 12 is being opened relative to the frame 14.

The link 20 is selectively, along its length, movable through the tunnel 24 of the housing 22, such that the door 12 is selectively movable relative to the frame 14. The check system 10 allows an infinite number of held positions or locations of the door 12 relative to the frame 14, such that an operator may select any position in which to hold the door 12 and may also move the door 12 between held positions. Whether straight or curved, the link 20 may define a link plane (not shown) that generally bisects the housing 22 and overlaps or coincides with the travel path of the housing 22.

The check system 10 may be used with many types of automobiles or vehicles, such as passenger, industrial, or military vehicles, or with mass transit vehicle (trains, boats, light-rail trams, airplanes, etc.). However, the check system 10 may also be used with other structures, including, without limitation: exterior or interior building doors, cabinet or storage doors, mobile housing entry ways, and hinged or sliding windows.

At least one friction plate 26 is disposed within the housing 22, and at least one biasing member 28 biases the friction plate 26 toward the link 20. The biasing member 28 is operatively attached to the housing 22 and applies force along an axis generally perpendicular to the link 20. Therefore, the friction plate 26 interacts with the link 20 to apply frictional holding force between the link 20 and the housing 22.

The housing 22 defines a first housing ramp or a closing housing ramp 30 at an acute angle relative to the link 20. There are two closing housing ramps 30 on opposing sides of a central plane of the housing 22. The link 20 also moves through the housing 22 generally at the central plane. Although not viewable in FIG. 1, there is another closing housing ramp 30 on the opposing side of the housing 22. Therefore, there are four closing housing ramps 30. The acute angle refers to a low angle (i.e., less than 45 degrees) relative to the central plane of the housing 22 or to the location of the link 20 within the tunnel 24.

The friction plate 26 defines a first plate ramp or a closing plate ramp 32. In the configuration shown, there are two friction plates 26, each of which includes one closing plate ramp 32 that mirrors the two sides of the closing housing ramp 30. Although not viewable in FIG. 1, there is another set of closing plate ramps 32 on the opposing side of the friction plates 26. The closing plate ramps 32 are slidably engaged with the closing housing ramps 30 and mirrored about a plane that is generally parallel to path of the link 20.

Therefore, in the configuration shown, there are a total of four closing plate ramps 32 on the two friction plates 26 to match the four closing housing ramps 30 on the housing 22. The configuration shown provides a symmetric array having pairs of closing ramps above and below the link 20 and also pairs of closing ramps to the left and right of the link 20. This configuration may provide balance for the closing movement.

Figure 2:
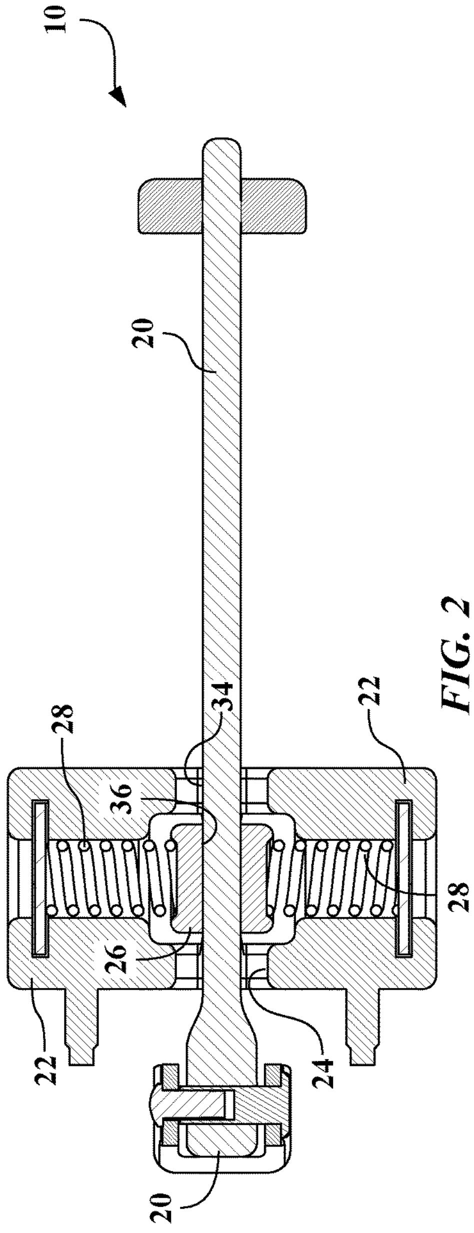
FIG. 2 is a schematic, cross-sectional view of the check system, taken generally along a line 2-2 of FIG. 1.
Figure 3:
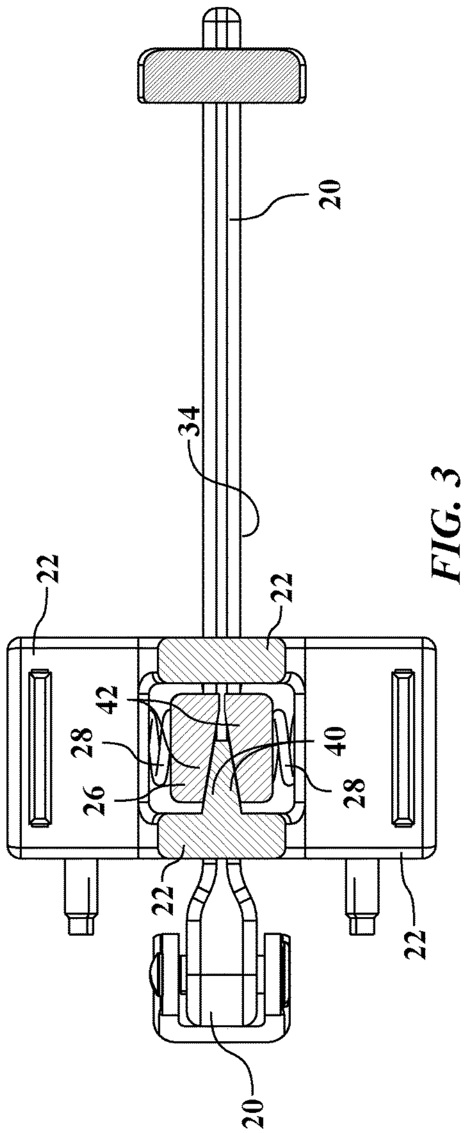
FIG. 3 is a schematic, cross-sectional view of the check system, taken generally along a line 3-3 of FIG. 1.

Referring also to FIG. 2 and FIG. 3, and with continued reference to FIG. 1, there are shown cross-sectional views of the check system 10. FIG. 2 shows a view taken generally along the line 2-2 of FIG. 1, which is at substantially the center of the check system 10. FIG. 3 shows a view taken generally along the line 3-3 of FIG. 1, which is offset from the center of the check system 10. Note that some elements illustrated in FIGS. 2 and 3 may not include cross-hatching.

As viewed in FIG. 2, the link 20 defines a link friction surface 34 and the friction plate 26 defines a plate friction surface 36, which corresponds to the link friction surface 34. In the configuration shown, there are two biasing members 28, each of which biases one of the friction plates 26 toward the link 20 and the closing housing ramp 30. Therefore, the biasing members 28 apply a generally perpendicular force to the friction plates 26, which results in friction force to the link 20.

As best viewed in FIG. 3, a second housing ramp or an opening housing ramp 40 is defined on the housing 22 at an acute angle to the link 20. The opening housing ramp 40 is opposite the closing housing ramp 30 relative to the link 20. The two surfaces forming the opening housing ramps 40 are viewable in FIG. 3, each on opposing sides of the central plane of the housing 22. Although not viewable in FIG. 3, there is another, substantially identical, set of opening housing ramps 40 on the opposing side of the housing 22. Therefore, in the configuration shown, there are four opening housing ramps 40 on the housing 22.

A second plate ramp or an opening plate ramp 42 is defined on the friction plate 26. There are two opening plate ramps 42 on each of the friction plates 26. The opening plate ramps 42 mirror and slidably interface with the opening housing ramps 40 on the housing 22. Therefore, in the configuration shown, there are a total of four opening plate ramps 42 to match the four opening housing ramps 40. The configuration shown provides a symmetric array having pairs of opening ramps above and below the link 20 and also pairs of opening ramps to the left and right of the link 20. This configuration may provide balance for the opening movement.

As described herein, the opening housing ramp 40 and the opening plate ramp 42 facilitate movement when an opening force is applied to the door 12 and also promote contact between the link friction surface 34 and the plate friction surface 36 when no force is applied to the door 12. Similarly, the closing housing ramp 30 and the closing plate ramp 32 facilitate movement when a closing force is applied to the door 12 and also promote contact between the link friction surface 34 and the plate friction surface 36 when no force is applied to the door 12. Therefore, the door 12 may be either held at a static position or moved, depending on whether there is a relative force applied between the door 12 and the frame 14.

Figure 4A:
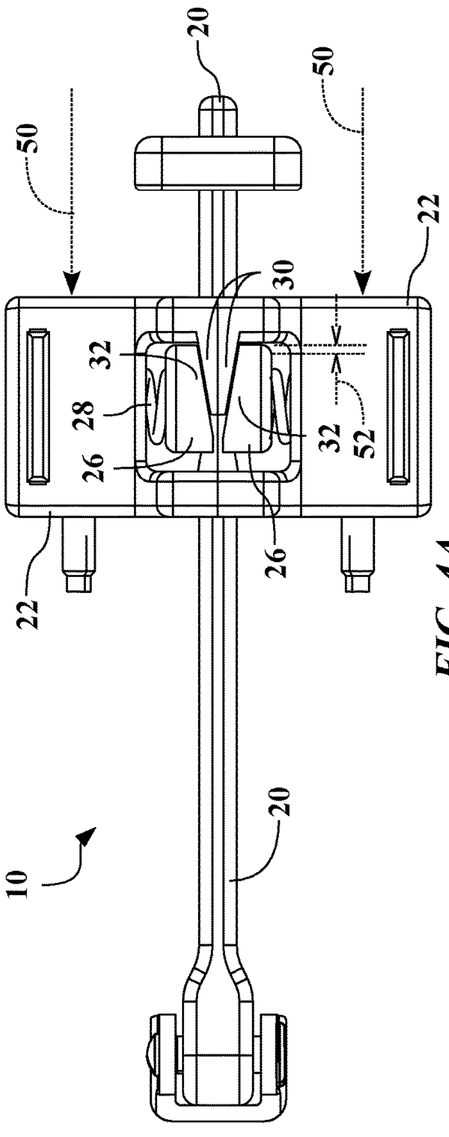
FIG. 4A is a schematic, side view of the check system, illustrated in an open position during application of a closing force.
Figure 4B:
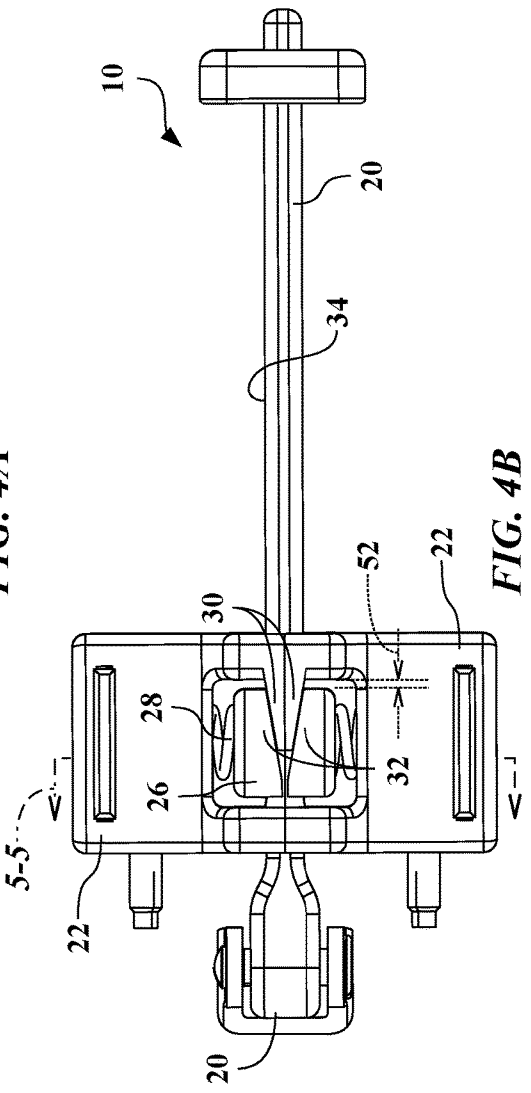
FIG. 4B is a schematic, side view of the check system, illustrated in a closed position.

Referring now to FIG. 4A and FIG. 4B, and with continued reference to FIGS. 1-3, two side views schematically illustrate operation of the check system 10. FIG. 4A shows a side view of the check system 10, illustrated in an open position and with a closing force being applied between the housing 22 and the link 20, as if the door 12 has a closing force 50 applied relative to the frame 14 (neither of which are shown in FIGS. 4A and 4B). FIG. 4B is a side view of the check system 10, illustrated in a static position after the door 12 has been closed.

As illustrated by FIG. 4A, when the closing force 50 is applied between the housing 22 and the link 20, the housing 22 tries to move leftward and the link 20 tries to move rightward (as viewed in FIGS. 4A and 4B). The link friction surfaces 34 of the link 20 interact with the plate friction surfaces 36 to move the friction plates 26 rightward, as illustrated by a shift 52 relative to the central or static position shown in FIG. 4B.

Movement of the friction plates 26 relative to the housing 22 causes the closing plate ramps 32 to move up the closing housing ramps 30 and to spread the friction plates 26 against the biasing members 28, as shown in FIG. 4A. In turn, separation or spreading of the friction plates 26 by the closing housing ramps 30 releases the frictional hold between the link 20 and the friction plates 26. The closing housing ramps 30 and the closing plate ramps 32 are at acute angles to the closing direction of the link 20, such that relatively low longitudinal force is required to push the closing plate ramps 32 up the closing housing ramps 30.

Relative longitudinal force or displacement between the link 20 and the housing 22 causes a separation of the friction plates 26 from the link 20 and lessens the frictional force therebetween. Therefore, the relative force between the link 20 and the housing 22 causes a reduction in the resisting frictional force between the friction plates 26 and the link 20 and allows movement of the link 20 through the tunnel 24.

The biasing members 28 are continuously pushing the friction plates 26 back down the closing housing ramps 30 toward the link 20, such that the biasing members 28 are constantly attempting to reapply or increase the friction force counteracting movement between the link 20 and the friction plates 26. Contrarily, longitudinal force between the housing 22 and the link 20 is attempting to separate the plate friction surface 36 of the friction plates 26 from the link friction surfaces 34 of the link 20 by moving the closing plate ramps 32 up the closing housing ramps 30.

The interaction of the restraining frictional force (between the link 20 and the friction plates 26) and the releasing force (between the closing plate ramps 32 and the closing housing ramps 30) determines whether the housing 22 is fixed relative to the link 20 or is moving relative to the link 20. Longitudinal force created by relative movement of the link 20 is translated by the closing plate ramps 32 and the closing housing ramps 30 into a spreading or releasing force that can overcome the frictional force of the friction plates 26, as long as the link 20 has sufficient closing force 50 applied thereto.

However, as longitudinal force and relative movement decreases, the biasing members 28 return the friction plates 26 down the closing housing ramps 30 and back into full contact with the link 20. The friction plates 26 maintain contact with either the closing housing ramps 30 or the opening housing ramps 40. In the neutral positions shown in FIGS. 3 and 4B, the friction plates 26 are in contact with both the closing housing ramps 30 and the opening housing ramps 40.

Depending on the coefficients of friction between the closing plate ramps 32 and the closing housing ramps 30, and between the link friction surface 34 and the plate friction surface 36, movement of the link 20 may result in a dynamic equilibrium in which the friction plates 26 are spread by the closing housing ramps 30 just enough to lessen the frictional force and allow the link friction surface 34 to slide relative to the plate friction surface 36. Alternatively, movement may result in an oscillating of the friction plates 26 off of, and then back onto, the link 20, such that each application of frictional force therebetween causes the friction plates 26 to again spread away from the link 20.

As shown in FIG. 4B, once the closing force 50 is removed, the biasing members 28 move the friction plates 26 inward. Static friction between the link friction surface 34 and the plate friction surface 36 holds the housing 22 in any position relative to the link 20.

Opening the housing 22 relative to the link 20 works substantially similar, but in the opposite direction and with the opposing ramp structures. Movement of the link 20 leftward or the housing 22 rightward (as viewed in FIG. 3) causes the opening plate ramp 42 to move up the opening housing ramp 40, which releases the friction force applied between the link friction surface 34 and the plate friction surface 36 and allows the link 20 to move through the tunnel 24 of the housing 22.

Figure 5:
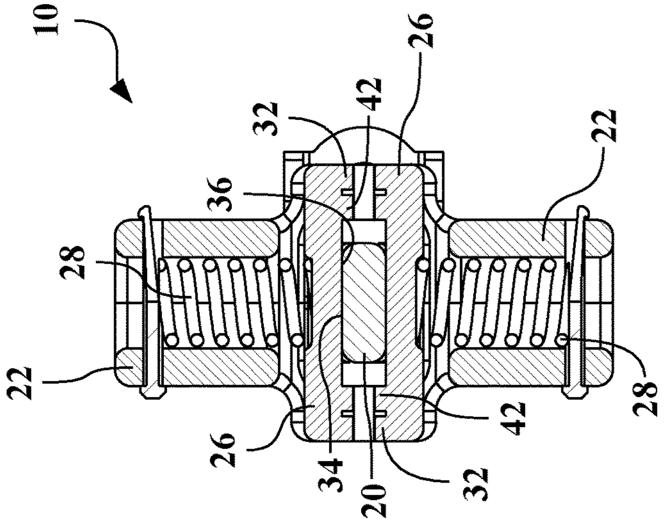
FIG. 5 is a schematic, cross-sectional view of the check system, taken generally along a line 5-5 of FIG. 4B.

Referring now to FIG. 5, and with continued reference to FIGS. 1-4B, there is shown a cross-sectional view of the check system 10 taken generally along line 5-5 of FIG. 4B. FIG. 5 illustrates the interaction between the link 20, the friction plates 26, and the housing 22. As viewed in FIG. 5, the biasing members 28 normally create contact between the link friction surface 34 and the plate friction surface 36.

In the configuration shown, the closing plate ramps 32 are on the exterior of the friction plates 26 and the opening plate ramps 42 are on the interior, relative to the link 20. However, these elements may be differently ordered.

Figure 6:
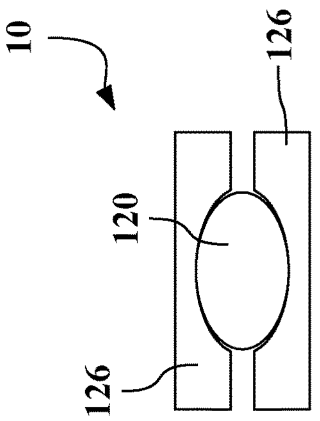
FIG. 6 is a schematic view of a link and friction plates for the check system shown in FIGS. 1-5, illustrating an elliptical friction interface.
Figure 7:
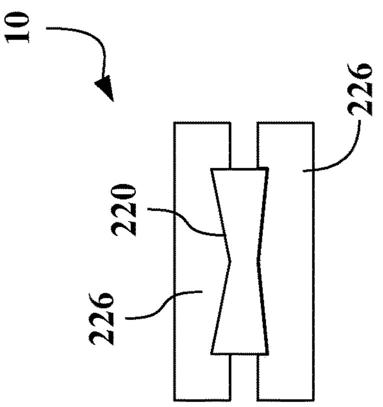
FIG. 7 is a schematic view of a link and friction plates for the check system shown in FIGS. 1-5, illustrating a diamond shape friction interface.

Referring also FIGS. 6 and 7, and with continued reference to FIGS. 1-5, there are shown additional views of friction interfaces usable with the check system 10. The elements of FIGS. 6 and 7 are illustrated from a similar viewpoint to that shown in FIG. 5 but do not include section lines or hatching.

FIG. 6 is a schematic end or plane intersection view of a link 120 and two friction plates 126, which may be used with the check system 10. The link 120 and friction plates 126 define an elliptical friction interface therebetween. FIG. 7 is a schematic end or plane intersection view of a link 220 and two friction plates 226, which may be used with the check system 10. The link 220 and friction plates 226 define V-shape or diamond shape friction interface.

The detailed description and the drawings or figures are supportive and descriptive of the subject matter discussed herein. While some of the best modes and other embodiments for have been described in detail, various alternative designs, configurations, and embodiments exist.

The invention claimed is:

1. A check system between a frame and a door, comprising:

a link attached to one of the door and the frame, and defining a link friction surface;

a housing attached to the other of the door and the frame, and defining a tunnel through which the link is selectively movable and a first housing ramp at an acute angle relative to the link;

a friction plate disposed within the housing, and defining a first plate ramp mirroring the first housing ramp and a plate friction surface in selective contact with the link friction surface, such that contact creates friction between the plate friction surface and the link friction surface; and a biasing member operatively attached to the housing and biasing the friction plate toward the link and the first housing ramp, wherein movement of the link relative to the housing causes movement of the friction plate relative to the housing, which moves the first plate ramp up the first housing ramp and reduces the friction between the plate friction surface and the link friction surface.

2. The check system of claim 1, wherein the first housing ramp is an opening housing ramp and the first plate ramp is an opening plate ramp, and the opening housing ramp and the opening plate ramp provide movement of the link in a first direction, and further comprising:

a closing housing ramp defined on the housing at an acute angle opposite the opening housing ramp; and a closing plate ramp defined on the friction plate and mirroring the closing housing ramp, such that the closing housing ramp and closing plate ramp provide movement in a direction opposite that of the opening housing ramp and the opening plate ramp.

3. The check system of claim 2, wherein the friction plate is a first friction plate, the plate friction surface is a first plate friction surface, the link friction surface is a first link friction surface, and the biasing member is a first biasing member, and further comprising:

a second link friction surface defined on the link opposite the first link friction surface;

a second friction plate disposed within the housing opposite the first friction plate, relative to the link, and having a second plate friction surface corresponding to the second link friction surface; and a second biasing member operatively attached to the housing and biasing the second friction plate toward the link.

4. The check system of claim 3, wherein the first friction plate has two closing plate ramps and two opening plate ramps disposed on opposing sides of the first plate friction surface, wherein the second friction plate has two closing plate ramps and two opening plate ramps disposed on opposing sides of the second plate friction surface, and wherein the housing has four closing housing ramps and four opening housing ramps symmetrically arrayed about the link and mirroring the closing plate ramps and the opening plate ramps of the first friction plate and the second friction plate.

5. The check system of claim 4, wherein movement of the link through the tunnel causes one of:

the two closing plate ramps and of the first friction plate and the two closing plate ramps and of the second friction plate to slide along the four closing housing ramps of the housing; and the two opening plate ramps and of the first friction plate and the two opening plate ramps and of the second friction plate to slide along the four opening housing ramps of the housing.

6. A vehicle, comprising:

a frame;

a door movably attached to the frame;

a check system disposed between the frame and the door and configured to provide a plurality of positions of the door relative to the frame, the check system including:

a link attached to one of the door and the frame, and defining a first link friction surface;

a housing attached to the other of the door and the frame, and defining a tunnel through which the link is movable, an opening housing ramp at an acute angle relative to the link, and a closing housing ramp at an acute angle opposite the opening housing ramp;

a first friction plate disposed within the housing, and defining an opening plate ramp slidably engaged with the opening housing ramp, a closing plate ramp slidably engaged with the closing housing ramp, and a first plate friction surface in selective contact with the first link friction surface; and a biasing member operatively attached to the housing and biasing the first friction plate toward the link, the opening housing ramp, and the closing housing ramp, wherein:

movement of the link in a first direction relative to the housing moves the opening plate ramp up the opening housing ramp and reduces the friction between the plate friction surface and the link friction surface, movement of the link in a second direction relative to the housing moves the closing plate ramp up the closing housing ramp and reduces the friction between the plate friction surface and the link friction surface, and lack of movement of the link relative to the housing allows the biasing member to engage the plate friction surface and the link friction surface.

7. The vehicle of claim 6, wherein the check system further includes:

a second link friction surface defined on the link opposite the first link friction surface;

a second friction plate, substantially identical to the first friction plate, disposed within the housing opposite the first friction plate, relative to the link, and having a second plate friction surface corresponding to the second link friction surface; and a second biasing member operatively attached to the housing and biasing the second friction plate toward the link.

8. The vehicle of claim 7, wherein the first friction plate of the check system has two closing plate ramps and two opening plate ramps disposed on opposing sides of the first plate friction surface, wherein the second friction plate of the check system has two closing plate ramps and two opening plate ramps disposed on opposing sides of the second plate friction surface, and wherein the housing of the check system has four closing housing ramps and four opening housing ramps symmetrically arrayed about the link and mirroring the closing plate ramps and the opening plate ramps of the first friction plate and the second friction plate.

* * * * *